United States Patent
Peng et al.

(10) Patent No.: US 12,477,641 B2
(45) Date of Patent: Nov. 18, 2025

(54) STAGE LIGHT SYSTEM FOR SYNCHRONIZED OPERATION OF SHOW

(71) Applicant: Guangzhou Haoyang Electronic Co., Ltd., Guangzhou (CN)

(72) Inventors: Yingru Peng, Guangzhou (CN); Weikai Jiang, Guangzhou (CN); Zhiming Li, Guangzhou (CN); Zhiguang Liang, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 160 days.

(21) Appl. No.: 18/452,137

(22) Filed: Aug. 18, 2023

(65) Prior Publication Data

US 2025/0008627 A1     Jan. 2, 2025

(30) Foreign Application Priority Data

Jun. 30, 2023   (CN) .................. 202310794246.X

(51) Int. Cl.
*H05B 47/10*    (2020.01)
*H05B 47/155*   (2020.01)
*H05B 47/16*    (2020.01)

(52) U.S. Cl.
CPC .......... *H05B 47/16* (2020.01); *H05B 47/155* (2020.01)

(58) Field of Classification Search
CPC ...... H05B 47/10; H05B 47/155; H05B 47/16; H05B 45/10
See application file for complete search history.

(56) References Cited

U.S. PATENT DOCUMENTS

2014/0285096 A1* 9/2014 Cuppen .................. G01B 11/14
                                                               315/153
2022/0070982 A1* 3/2022 Hussell .................. H05B 47/11

FOREIGN PATENT DOCUMENTS

KR       2016086104 A  *  7/2016 ........ H04W 56/0015

* cited by examiner

*Primary Examiner* — Jimmy T Vu
(74) *Attorney, Agent, or Firm* — MUNCY, GEISSLER, OLDS & LOWE, P.C.

(57) ABSTRACT

A stage light system for synchronized operation of a show includes a plurality of stage lights, each stage light has an ad hoc network module; and a controller for controlling the stage light. A LAN is established among at least a portion of the stage lights by the controller through the ad hoc network module, in such LAN one of the stage lights is selected as a master node and the rest are taken as a plurality of follower nodes. All of the stage lights in the LAN are configured to perform time synchronization, and send the current show frame information of the master node to the follower nodes and adjust respective show frames of the follower nodes according to the current show frame information of the master node.

12 Claims, 3 Drawing Sheets

STAGE LIGHT SYSTEM FOR SYNCHRONIZED OPERATION OF SHOW

CROSS REFERENCE TO RELATED APPLICATIONS

The present application claims priorities from Chinese Application No. CN 202310794246.X filed on Jun. 30, 2023, all of which are hereby incorporated herein by reference.

TECHNICAL FIELD

The present invention relates to the technical field of stage lights, and more particularly, relates to a stage light system for synchronized operation of a show.

BACKGROUND

The current commercial stage lights are substantially controlled based on a DMX512 protocol. Such protocol is realized in a form of broadcasting by a console. In a stage performance with such stage lights, the show display of different lights is usually executed sequentially with the aid of a timer. Accordingly, the console is unable to know the state of the lights. When a plurality of lights are required to start a show at the same time, if the protocol packet received by one of the lights gets lost, the show start time thereof will be later than that of other lights, resulting in that the plurality of stage lights will appear to display the show out of synchronization. However, the current console generally cannot automatically adjust the show display to be synchronized, due to lack of a feedback mechanism in the control system.

SUMMARY

The present invention thus provides a stage light system for synchronized operation of a show, which can realize synchronized operation of the show among a plurality of stage lights.

According to the present invention, a stage light system for synchronized operation of a show includes a plurality of stage lights and a controller for controlling the stage lights. In the present invention, each stage light has an ad hoc network module. A local area network (LAN) is established among at least a portion of the stage lights with the help of the ad hoc network module thereof under the control of the controller, in such LAN one of the stage lights is selected as a master node, and the rest of the stage lights in the LAN are taken as follower nodes. It is configured that all of the stage lights in the LAN performs time synchronization, the current show frame information of the master node is sent to the follower nodes, and the follower nodes adjusts their own show frames according to the current show frame information of the master node.

According to the stage light system for synchronized operation of the show in the present invention, by equipping each stage light with the ad hoc network module, the LAN is established, so that the stage lights in the LAN can communicate with each other and the time of the stage lights as the follower nodes can be consistent with the time of the stage light as the master node to achieve time consistency of all the stage lights in the LAN. Meanwhile, the follower nodes can adjust their own show frame according to the current show frame information of the master node, thereby achieving synchronous operation of the show for the stage lights in the LAN.

In the present invention, in order to coordinate the master node in consistency with the follower nodes in a beneficial way and avoid a conflict in the logic of the follower nodes due to simultaneous receipt of commands from the controller and the master node, it is configured that after the LAN is established, all the follower nodes are made to be in a pending synchronization state, and the follower nodes in the pending synchronization state are designed to keep silence on a signal sent from the controller and only have response to the signal from the master node.

In particular, show data to be displayed by the stage lights is forwarded to the follower nodes through the master node by the controller according to the present invention. As the show data is gradually sent by the controller during the process of displaying the show by the stage lights, it thus enables better synchronization of the show of the follower nodes with the show of the master node by forwarding the show data through the master node and as well avoids data interference with the follower nodes from the controller.

It is beneficial to facilitate automatically maintaining consistency of the show frame of the follower nodes and the master node by adjusting time of the follower nodes in real time to keep the time difference with the master node within a preset value range. According to the present invention, each follower node, after receiving the current show frame information of the master node, is configured to feedback respective current show frame information to the master node, and the master node can determine whether the time difference between the show frame of each follower node and the show frame of the master node is greater than a preset value, if yes, the time of the corresponding follower node is re-synchronized, and the show frame thereof will be updated according to the synchronized time; and if not, the current show frame of each follower node keeps unchanged.

Particularly, when the time difference between the show frame of a certain follower node and the show frame of the master node is greater than a preset value, such follower node is firstly synchronized its show frame according to the current show frame information of the master node, then the time of the follower node is re-synchronized and the show frame thereof is further updated according to the synchronized time. By synchronizing the show frame of the follower node according to the current show frame information of the master node, the follower node can be made to keep up with the rhythm of the master node as soon as possible. Based on this, the time of the follower node is further re-synchronized and the show frame is updated according to the synchronized time, thus ultimately realizing the complete consistency of the show frame between the follower nodes and the master node.

Given that all the follower nodes can receive information from the master node, using the time of the master node as a reference can facilitate controlling of the time of all the follower nodes to make the time of the entire LAN consistent. Therefore, in the time synchronization, the time of the master node is used as a reference according to the present invention.

As WIFI module or Bluetooth module is a common type of ad hoc network module in stable performance and mature technology. The ad hoc network module in the present invention may preferably be in form of a WIFI module or a Bluetooth module.

In the present invention, a networking module is further included and the LAN is connected to the Internet through the networking module. In such way, the state, effect, etc. of the stage lights can be uploaded to the Internet, or commands from the Internet can be received by the LAN, leading to the stage light system in more powerful performance.

The present invention can indicate the user to note whether the LAN established is correct or not by automatically flickering the stage light once receiving the ad hoc network flag. In particularly, the controller, when controlling at least a portion of the plurality of the stage lights to establish the LAN via the respective ad hoc network module, may send an ad hoc network flag to the corresponding stage light, and the corresponding stage light automatically flickers after receiving the ad hoc network flag and establishes the LAN via the ad hoc network module.

The master node is preferably determined based on the RSSI (signal strength of a received signal strength indication) signal strength. In such way, it can ensure that the stage light selected as the master node has the highest integrated signal strength in all the follower nodes in comparison to the other stage lights as the master nodes, thereby facilitating data transmission.

In the present invention, the show frame information preferably refers to the time point of the show. That is, the show frame information transmitted between the master node and the follower nodes is the time point of the show, indicating at which stage the show is running.

In particular, the controller may be a DMX512 (Digital Multiple X 512) console. Therefore, without altering the existing console, the information exchange between all the stage lights and the synchronized operation of the show of the stage lights can be achieved simply with the arrangement of the ad hoc network module on the stage lights.

In the present invention, the stage lights establishing the LAN can be from a plurality of links, or all of them can be from one of the links, and the master node can/cannot be located on the same link as any of the follower nodes. For this, the controller may be connected to a plurality of links, each of the links is provided with at least one stage light, and each of the stage lights is provided with the ad hoc network module.

DETAILED DESCRIPTION

Figure 1:
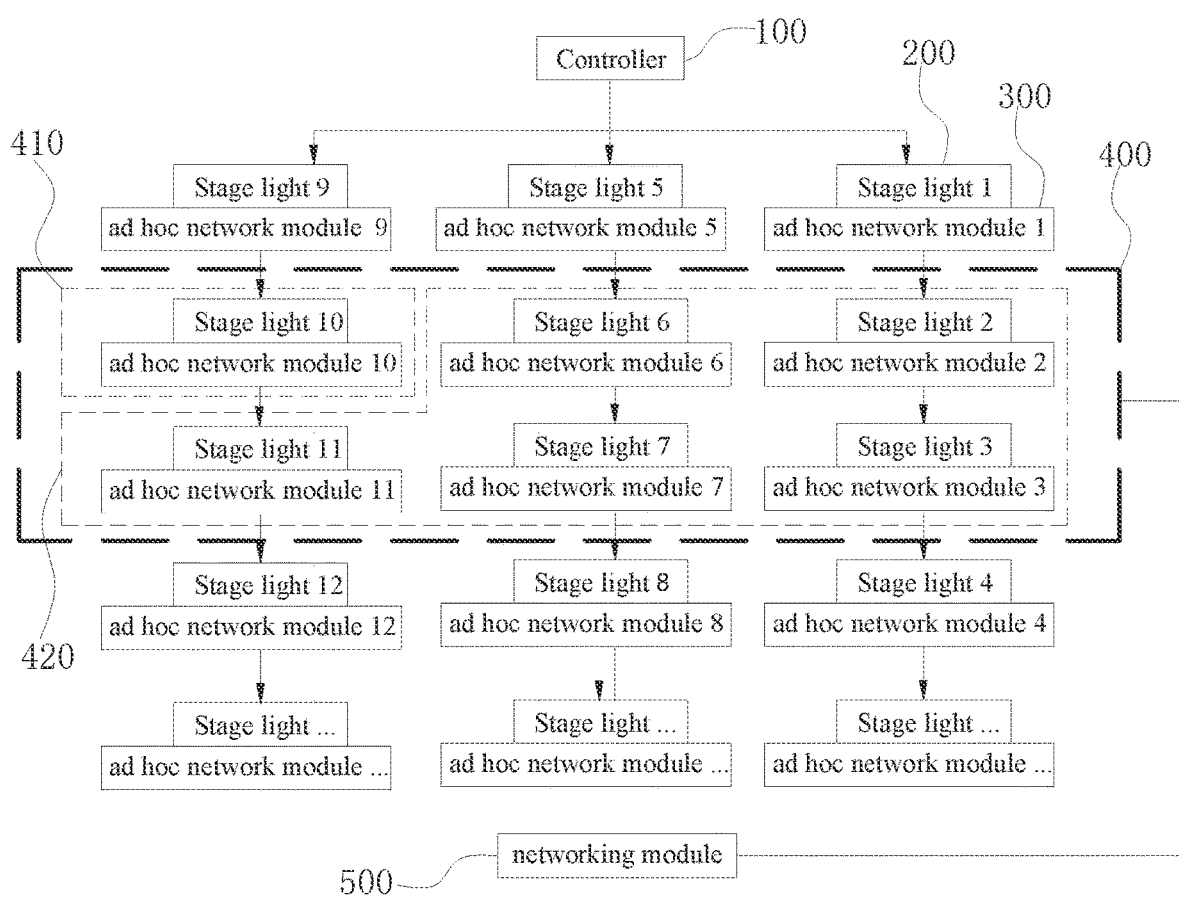
FIG. 1 is a block diagram of a stage light system for synchronized operation of a show according to an embodiment of the present invention.

The accompanying drawings are for exemplary illustration only, and should not be construed as limitations on this invention; in order to better illustrate this embodiment, some parts in the accompanying drawings may be omitted, enlarged or reduced, and they do not represent the size of the actual product; for those skilled in the art, it is understandable that certain well-known structures and descriptions thereof in the drawings may be omitted. The positional relationship described in the drawings is only for exemplary illustration, and should not be construed as limitations on this invention.

Figure 2:
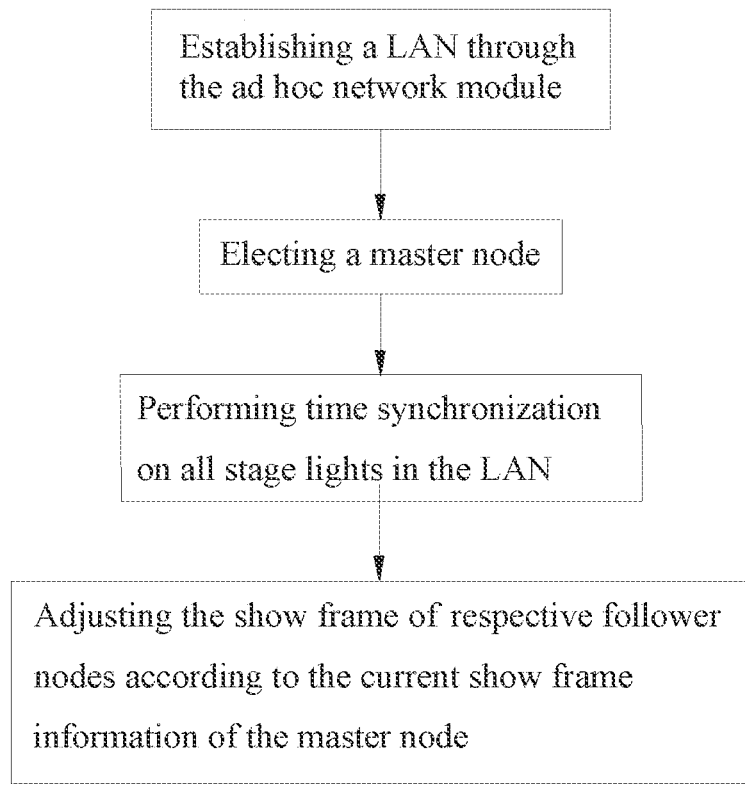
FIG. 2 is a flowchart of the operation of a stage light system according to an embodiment of the present invention.

Referring to FIG. 1 and FIG. 2, a stage light system for synchronized operation of a show is provided according to an embodiment of the present invention, which includes a plurality of stage lights 200 and a controller 100 for controlling the stage lights 200. In the present embodiment, each stage light 200 has an ad hoc network module 300. A LAN 400 thus is established among at least a portion of the stage lights 200 with the help of the ad hoc network module 300 thereof under the control of the controller 100, in such LAN 400 one of the stage lights 200 is selected as a master node 410 and the rest of the stage lights 200 are taken as a plurality of follower nodes 420. All of the stage lights 200 in the LAN 400 are configured to perform time synchronization and enable the current show frame information of the master node 410 to send to the follower nodes 420 and further enable the follower nodes 420 to adjust the show frame thereof according to the current show frame information of the master node 410.

According to the stage light system for synchronized operation of the show, by equipping each stage light 200 with the ad hoc network module 300, the LAN 400 is established, so that the stage lights 200 in the LAN 400 can communicate with each other and the time of the stage lights 200 as the follower nodes 420 can be consistent with the time of the stage light 200 as the master node 410 to achieve time consistency of all the stage lights 200 in the LAN 400. Meanwhile, the follower nodes 420 can adjust their own show frame according to the current show frame information of the master node 410, thereby achieving synchronous operation of the show for the stage lights 200 in the LAN 400.

It should be noted that the synchronized operation of the show for the stage lights 200 within the LAN 400 described means that the show of each stage light 200 in the LAN 400 is displayed in accordance with a uniform time, rather than the show frames of the individual stage lights 200 in the LAN 400 are the same at the same time. This is because the show frames of the individual stage lights 200 may or may not be the same at the same time in a show, but they required to be displayed sequentially in an established order to demonstrate the intended effects, and cannot to be displayed with some in advance and some delayed, which may deviate from the intended effects.

Of course, the LAN 400 may also include all of the stage lights 200 provided with the respective ad hoc network module 300 according to other embodiments.

In a preferred embodiment of the present invention, the show frame information preferably refers to the time point of the show. That is, the show frame information transmitted between the master node 410 and the follower nodes 420 is the time point of the show, indicating at which stage the show is running.

Optionally, the time point of the show may be a customized time within the LAN 400, or may be Beijing time or an official time anywhere in the world.

According to other embodiments, the show frame information may also be a parameter of a lighting effect displayed by the show frame. In such case, the time point of the show is indirectly deduced according to the parameter of the lighting effect.

In a preferred embodiment of the present invention, after the LAN 400 is established, all the follower nodes 420 are in a pending synchronization state, and the follower nodes 420 in the pending synchronization state are configured to keep silence on a signal sent by the controller 100 and only have response to the signal from the master node 410. In this way, it is beneficial for the master node 410 to coordinate the follower nodes 420 to be consistent therewith and avoids a conflict in the logic of the follower nodes 420 due to simultaneous receipt of commands from the controller 100 and the master node 410. In fact, the signal sent by the controller 100 is always sent to all the stage lights 200 within the LAN 400.

In particular, the follower nodes 420 are made to be all in the pending synchronization state in a way that the controller 100 sends a pending synchronization command to all the stage lights 200 within the LAN 400, the follower nodes 420 all entering in the pending synchronization state and meanwhile the master node 410 knowing that the follower nodes 420 are already in the pending synchronization state based on the pending synchronization command.

Subsequent to the follower nodes 420 being all in the pending synchronization state, when the master node 410 sends out a synchronization command (at this time the controller 100 also sends a synchronization command to all the stage lights 200 within the LAN 400, but only the master node 410 responds and sends the corresponding synchronization command to the follower nodes 420), each follower node 420 starts to adjust its own show frame according to the current show frame information of the master node 410, thereby achieving the effect of synchronized operation of the show for the stage lights 200 within the LAN 400.

In a preferred embodiment of the present invention, the show data to be displayed by the stage lights 200 is forwarded to the follower nodes 420 through the master node 410 by the controller 100. As the show data is gradually sent by the controller 100 during the process of displaying the show by the stage lights 200, forwarding the show data through the master node 410 enables better synchronization of the show of the follower nodes 420 with the show of the master node 410 and as well avoids data interference with the follower nodes 420 from the controller 100.

Figure 3:
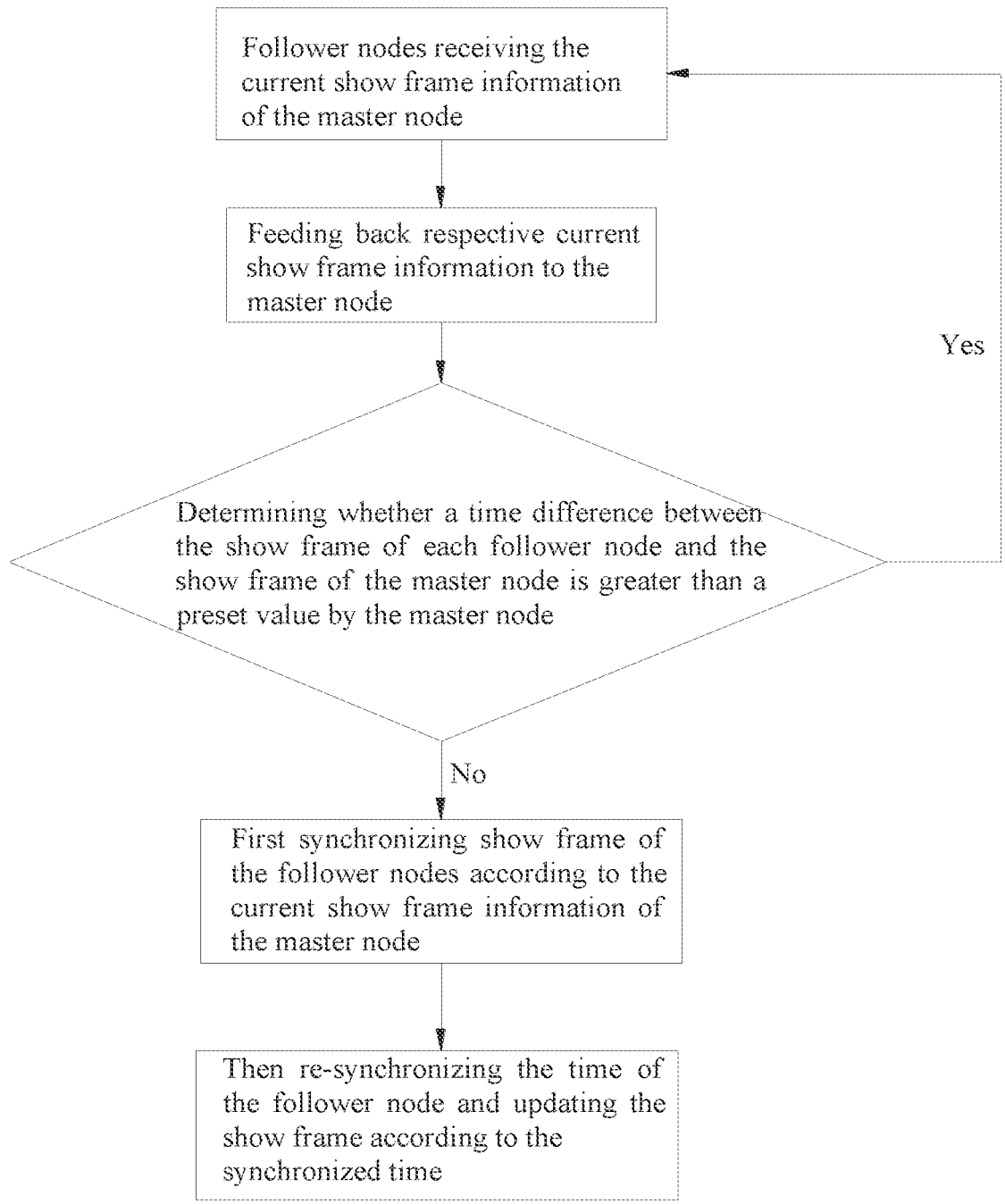
FIG. 3 is a flowchart of a stage light system according to an embodiment of the present invention, showing how the time of a follower node is adjusted in real time.

Referring to FIG. 3, in a preferred embodiment of the present invention, each follower node 420, after receiving the current show frame information of the master node 410, feeds back current show frame information thereof to the master node 410, and the master node 410 determines whether the time difference between the show frame of each follower node 420 and the show frame of the master node 410 is greater than a preset value, if yes, the time of the corresponding follower node 420 is re-synchronized and the show frame thereof will be updated according to the synchronized time; and if not, the current show frame of each follower node 420 keeps unchanged. As known, the stage lights 200 generally relies on its own crystal oscillator to provide time indication during its operation, but the precision of the crystal oscillator of the stage lights 200 is usually limited, which may cause that the deviation between each other after a period of operation will obviously affect the synchronization of the show frame of different stage lights 200 (the crystal oscillator error is generally around 10 us to 1 ms, and the naked eye can be aware of out of synchronization in more than 20 ms). Therefore, respective current show frame information of the follower nodes 420 is fed back to the master node 410 and the show frame time difference with the master node 410 is further calculated in the present embodiment, so that in the process of displaying the show by the stage lights 200, the time of the follower nodes 420 can be adjusted in real time to keep the time difference with the master node 410 within a preset value range, thus facilitating automatically maintaining consistency of the show frame of the follower nodes 420 and the master node 410.

Optionally, the preset value is preferably 5 ms.

In particular, when the time difference between the show frame of a certain follower node 420 and the show frame of the master node 410 is greater than a preset value, such follower node 420 is firstly synchronized its show frame according to the current show frame information of the master node 410, then the time of the follower node 420 is re-synchronized and the show frame is updated according to the synchronized time, i.e., the show frame corresponding to the synchronized time. By synchronizing the show frame of the follower node 420 according to the current show frame information of the master node 410, the follower node 420 can be made to keep up with the rhythm of the master node 410 as soon as possible. In this case, by further re-synchronizing the time of the follower node 420 and updating the show frame thereof according to the synchronized time, complete consistency of the show frame between the follower node 420 and the master node 410 can be ultimately realized.

In the time synchronization, the time of the master node 410 is used as a reference according to a preferable embodiment. Given that all the follower nodes 420 can receive information from the master node 410, using the time of the master node 410 as a reference can facilitate controlling of the time of all the follower nodes 420 to make the time of the entire LAN 400 consistent.

It should be noted that in the time synchronization, the controller 100 broadcasts the time to all the stage lights 200 within the LAN 400, but only the master node 410 responds to send the time to the follower node 420.

The ad hoc network modules 300 may be in wired connection, wireless connections, or a combination of wireless and wired connections with each other. More preferably the ad hoc network module 300 is a WIFI module or a Bluetooth module, which can reduce connecting cables between the stage lights 200. Such ad hoc network module 300 is a common type of ad hoc network module with stable performance and mature technology.

The stage lights 200 can communicate with the respective ad hoc network module 300 via an RS485 protocol.

In a preferred embodiment of the present invention, a networking module 500 is further included, and the LAN 400 is connected to the Internet through the networking module 500. In such way, the state, effect, etc. of the stage lights 200 can be uploaded to the Internet, or commands from the Internet can be received by the LAN, thus making the stage light system more powerful in terms of performance.

Preferably, the networking module 500 is connected to the ad hoc network module 300 of the main node 410.

In a preferred embodiment of the present invention, the controller 100, when controlling the at least a portion of the plurality of the stage lights 200 to establish the LAN 400 via the respective ad hoc network module 300, may send an ad hoc network flag to the corresponding stage light 200, and the corresponding stage light 200 automatically flickers after receiving the ad hoc network flag and establishes the LAN 400 via the ad hoc network module 300. The configuration of the stage light 200 automatically flickering once receiving the ad hoc network flag can indicate the user whether the LAN 400 established is correct.

In a preferred embodiment of the present invention, the master node 410 is determined based on the RSSI signal strength. In such way, it ensures that the stage light 200 selected as the master node 410 has the highest integrated signal strength in all the follower nodes 420 in comparison to the other stage lights 200 as the master node 410, which facilitates data transmission. Determining the master node 410 based on the RSSI signal strength is conducted by comparing the signal strength between any two stage lights

200 and comprehensively calculating to obtain the optimal solution, which is well known in the prior art and will not be further described herein.

Preferably, the processing capacity of the processor of the stage light 200 as the master node 410 is greater than that of the stage lights 200 as the follower nodes 420, thereby further facilitating data processing.

In a preferred embodiment of the present invention, the controller 100 is a DMX512 console. Therefore, without altering the existing console, information exchange between all the stage lights 200 and the synchronized operation of the show of the stage lights 200 can be achieved simply with the ad hoc network module 300 of the stage lights 200 provided.

In particular, the DMX512 console is in wired connection to the stage light 200 via a cable.

In a preferred embodiment of the present invention, the controller 100 is connected to a plurality of links, each of the links is provided with at least one stage light 200, and each of the stage lights 200 is provided with the ad hoc network module 300. As such, the stage lights 200 establishing the LAN 400 may be from several links, or all of them may be from one of the links, and the master node 410 may not be located on the same link as any of the follower nodes 420, or may be located on the same link as all of the follower nodes 420.

Obviously, the above-mentioned embodiments of the present invention are only examples for clearly illustrating the present invention, rather than limiting the implementation modes of the present invention. For those of ordinary skill in the art, changes or modifications in other different forms can also be made on the basis of the above description. It is not needed and it is impossible to list all implementation modes here. Any modifications, equivalent replacements and improvements made within the spirit and principles of the present invention shall be included within the protection scope of the claims of the present invention.

What is claimed is:

1. A stage light system for synchronized operation of a show, comprising
   a plurality of stage lights, each stage light has an ad hoc network module; and
   a controller for controlling the stage lights,
   wherein a local area network (LAN) is established among at least a portion of the stage lights with the help of the ad hoc network module thereof under the control of the controller, in such LAN one of the stage lights is selected as a master node and the rest of the stage lights are taken as a plurality of follower nodes,
   all of the stage lights in the LAN are configured to perform time synchronization, and send a current show frame information of the master node to the follower nodes and adjust respective show frames of the follower nodes according to the current show frame information of the master node, and
   subsequent to the LAN being established, all the follower nodes are in a pending synchronization state and the follower nodes in the pending synchronization state are configured to keep silence on a signal sent from the controller, and only have response to a signal from the master node.

2. The stage light system according to claim 1, wherein show data to be displayed by the stage lights is forwarded to the follower node through the master node by the controller.

3. The stage light system according to claim 1, wherein once receiving the current show frame information of the master node, each follower node is fed back respective current show frame information to the master node, and the master node is configured to determine whether time difference between the show frame of each follower node and the show frame of the master node is greater than a preset value,
   if yes, the time of the corresponding follower node is re-synchronized, and the show frame information thereof is updated according to the synchronized time; and
   if not, the current show frame information of each follower node keeps unchanged.

4. The stage light system according to claim 3, wherein when the time difference between the show frame of a certain follower node and the show frame of the master node is greater than a preset value, such follower node is firstly synchronized the show frame thereof according to the current show frame information of the master node, then the time of the follower node is re-synchronized and the show frame is updated according to the synchronized time.

5. The stage light system according to claim 1, wherein in the time synchronization, the time of the master node is used as a reference.

6. The stage light system according to claim 1, wherein the ad hoc network module is in form of a WIFI module or a Bluetooth module.

7. The stage light system according to claim 1, further comprising a networking module, the LAN being connected to the Internet through the networking module.

8. The stage light system according to claim 1, wherein when controlling the at least portion of the stage lights to establish the LAN through the ad hoc network module, the controller is configurated to send an ad hoc network flag to the corresponding stage light, and the corresponding stage light is adapted to automatically flicker once receiving the ad hoc network flag and establish the LAN through the ad hoc network module.

9. The stage light system according to claim 1, wherein the master node is determined based on RSSI signal strength (signal strength of a received signal strength indication).

10. The stage light system according to claim 1, wherein the show frame information refers to a time point of the show.

11. The stage light system according to claim 1, wherein the controller is designed in form of a DMX512 console.

12. The stage light system according to claim 1, wherein the controller is connected to a plurality of links, each of the links is provided with at least one of the stage lights, and each of the stage lights is provided with the ad hoc network module.

* * * * *